(12) United States Patent
Wilson et al.

(10) Patent No.: US 10,976,463 B2
(45) Date of Patent: Apr. 13, 2021

(54) CONDUCTIVITY-DEPTH TRANSFORMS OF ELECTROMAGNETIC TELEMETRY SIGNALS

(71) Applicant: Halliburton Energy Services, Inc., Houston, TX (US)

(72) Inventors: Glenn Andrew Wilson, Houston, TX (US); Yijing Fan, Houston, TX (US); Paul Cooper, Humble, TX (US); Matthew Hui Chong, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 357 days.

(21) Appl. No.: 15/762,153

(22) PCT Filed: Nov. 4, 2015

(86) PCT No.: PCT/US2015/059075
§ 371 (c)(1),
(2) Date: Mar. 22, 2018

(87) PCT Pub. No.: WO2017/078708
PCT Pub. Date: May 11, 2017

(65) Prior Publication Data
US 2018/0259670 A1    Sep. 13, 2018

(51) Int. Cl.
*G01V 3/20* (2006.01)
*G01V 3/26* (2006.01)
(Continued)

(52) U.S. Cl.
CPC .............. *G01V 3/26* (2013.01); *G01N 27/04* (2013.01); *G01V 3/30* (2013.01); *G01V 3/38* (2013.01)

(58) Field of Classification Search
CPC . G01V 3/26; G01V 27/04; G01V 3/30; G01V 3/38
See application file for complete search history.

(56) References Cited

U.S. PATENT DOCUMENTS

| | | | |
|---|---|---|---|
| 4,209,747 A | * | 6/1980 | Huchital ............... G01V 3/30 324/338 |
| 4,899,112 A | | 2/1990 | Clark et al. |

(Continued)

OTHER PUBLICATIONS

International Search Report and Written Opinion for PCT/US2015/059075 dated Aug. 3, 2016.
(Continued)

*Primary Examiner* — John E Breene
*Assistant Examiner* — Christine Y Liao
(74) *Attorney, Agent, or Firm* — Benjamin Ford; C. Tumey Law Group PLLC

(57) ABSTRACT

A system includes an electromagnetic logging tool that transmits an electromagnetic signal as the tool is conveyed along a borehole through a formation. The system further includes a processing system that measures a first signal level in response to the tool being at a first measured depth, determines a first conductance based on the first signal level, measures a second signal level in response to the tool being at a second measured depth greater than the first measured depth, the second measured depth and the first measured depth defining a formation interval there between, determines a second conductance based on the second signal level, and assigns a uniform resistivity value to the formation interval based on the first conductance and the second conductance.

14 Claims, 8 Drawing Sheets

(51) Int. Cl.
*G01V 3/30* (2006.01)
*G01N 27/04* (2006.01)
*G01V 3/38* (2006.01)

(56) References Cited

U.S. PATENT DOCUMENTS

| | | | |
|---|---|---|---|
| 5,160,925 | A | 11/1992 | Dailey et al. |
| 5,163,521 | A | 11/1992 | Pustanyk et al. |
| 5,230,386 | A | 7/1993 | Wu et al. |
| 5,235,285 | A | 8/1993 | Clark et al. |
| 5,339,037 | A | 8/1994 | Bonner et al. |
| 5,448,227 | A | 9/1995 | Orban et al. |
| 5,563,513 | A * | 10/1996 | Tasci .................. G01V 3/02 324/359 |
| 5,781,436 | A | 7/1998 | Forgang et al. |
| 6,188,222 | B1 | 2/2001 | Seydoux et al. |
| 6,359,438 | B1 | 3/2002 | Bittar |
| 6,405,136 | B1 | 11/2002 | Li et al. |
| 6,577,129 | B1 | 6/2003 | Thompson et al. |
| 6,885,942 | B2 | 4/2005 | Shray et al. |
| 7,093,672 | B2 | 8/2006 | Seydoux et al. |
| 7,209,834 | B2 | 4/2007 | Galil |
| 7,782,060 | B2 | 8/2010 | Clark et al. |
| 8,442,769 | B2 | 5/2013 | Phillips et al. |
| 9,043,153 | B2 | 5/2015 | Denichou |
| 2005/0068703 | A1 | 3/2005 | Dopf et al. |
| 2007/0137854 | A1 | 6/2007 | Homan et al. |
| 2012/0081121 | A1 | 8/2012 | Maurer et al. |
| 2014/0249754 | A1 | 9/2014 | Donderici et al. |
| 2015/0061684 | A1 * | 3/2015 | Marsala .................. G01V 3/20 324/355 |
| 2016/0245952 | A1 * | 8/2016 | Dupuis .................... G01V 3/08 |

OTHER PUBLICATIONS

"LWD Induction Tool" Retrieved from: http://petrowiki.org/LWD_induction_tools, dated Jun. 25, 2018.

* cited by examiner

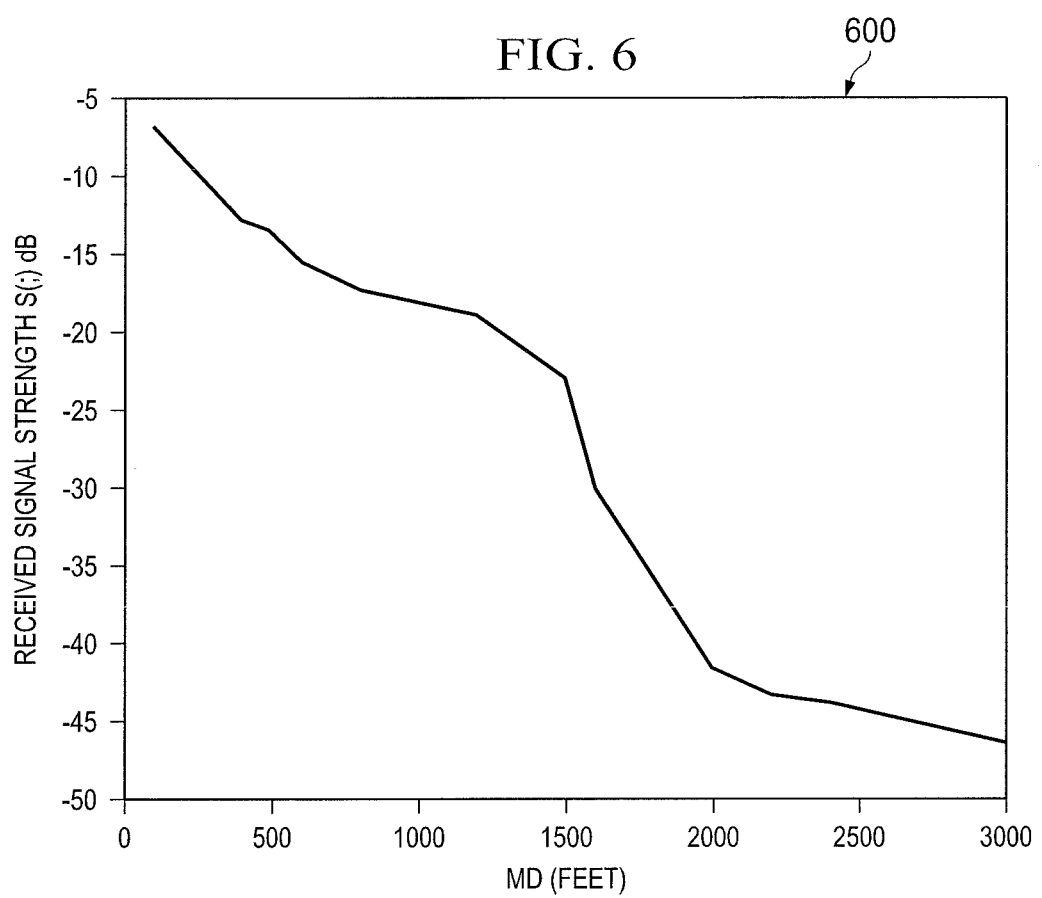

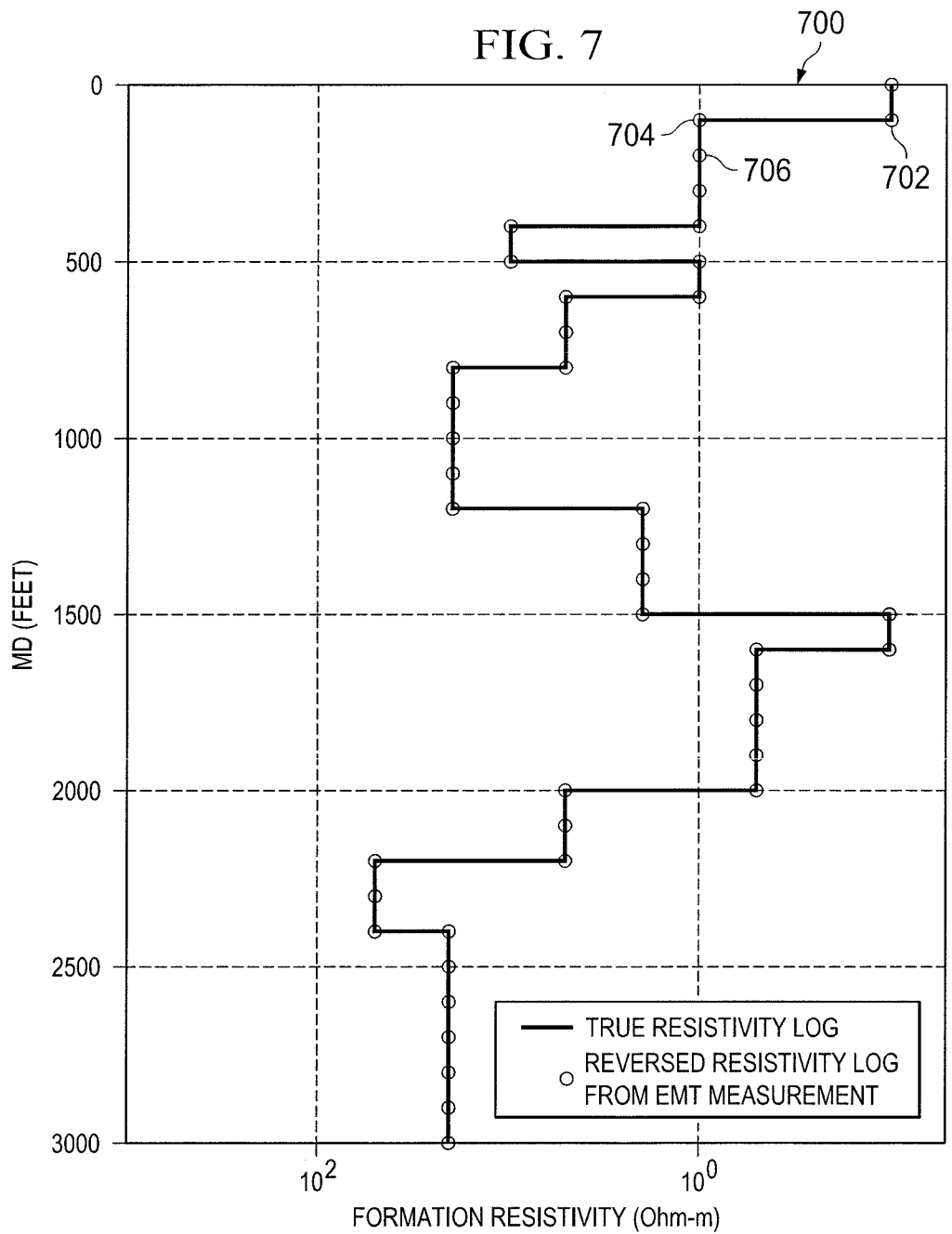

CONDUCTIVITY-DEPTH TRANSFORMS OF ELECTROMAGNETIC TELEMETRY SIGNALS

BACKGROUND

In the field of well drilling and logging, resistivity logging tools are frequently used to provide an indication of the electrical resistivity of rock formations surrounding an earth borehole. Such information regarding resistivity is useful in ascertaining the presence or absence of fluids, such as hydrocarbons. A typical electromagnetic propagation resistivity logging tool includes at least one transmitting antenna and multiple receiving antennas located at different distances from the transmitter antenna along the axis of the tool. The transmitting antenna generates electromagnetic fields in the surrounding formation, which in turn induce a response in each receiving antenna. Due to geometric spreading and absorption by the surrounding earth formation, the responses in the receiving antennas have different phases and amplitudes. Examples of such resistivity logging while drilling (LWD) tools include Sperry Drilling's EWR, and ADR services. However, in some drilling operations, it may be economically infeasible for operators to run such tools in every well, leaving them without any direct measurements of formation resistivities around the borehole.

BRIEF DESCRIPTION OF THE DRAWINGS

Accordingly, there are disclosed in the drawings and the following description conductivity-depth transforms for use with methods and systems employing an electromagnetic telemetry tool. In the drawings:

FIG. 6 is a graph showing illustrative signal levels received during an illustrative logging scenario.

FIG. 7 is a graph showing an illustrative resistivity profile.

Figure 1:
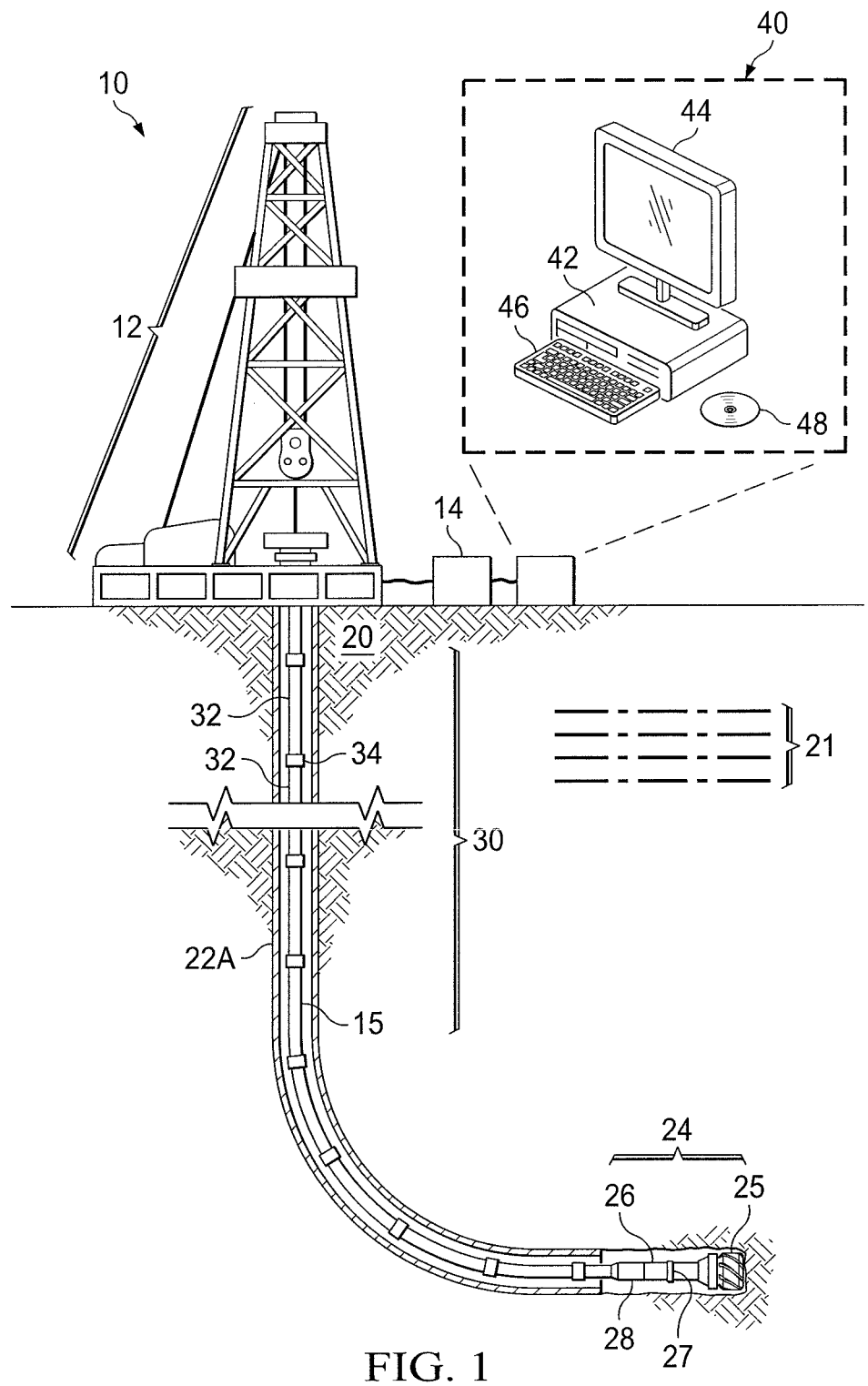
FIG. 1 is a schematic diagram showing an illustrative logging scenario.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems employing electromagnetic (EM) telemetry signals for generating formation resistivity logs. For example, received telemetry signals may be used to determine the formation resistivity along a wellbore. This determination of the formation resistivity does not require running a resistivity logging-while-drilling (LWD) tool (e.g., a tool that includes at least one transmitting antenna and multiple receiving antennas located at different distances from the transmitter antenna along the axis of the tool). Using the received telemetry signals may involve processing of real-time telemetry data and/or processing of post-drilling telemetry data. As such, in situations where resistivity logs were not previously generated, it may be possible to generate resistivity logs by re-processing historical telemetry datasets.

In at least some embodiments, a method includes disposing a transmitter at a first measured depth, measuring a first signal level in response to the transmitter being at the first measured depth, and determining a first conductance based on the first signal level. The method further includes disposing the transmitter at a second measured depth greater than the first measured depth, the second measured depth and the first measured depth defining a formation interval there between. The method further includes measuring a second signal level in response to the transmitter being at the second measured depth, determining a second conductance based on the second signal level, and assigning a uniform resistivity value to the formation interval based on the first conductance and the second conductance. A related system includes an electromagnetic telemetry tool that transmits an electromagnetic signal as the tool is conveyed along a borehole through a formation. The system further includes a processing system that measures a first signal level in response to the tool being at a first measured depth, determines a first conductance based on the first signal level, and measures a second signal level in response to the tool being at a second measured depth greater than the first measured depth, the second measured depth and the first measured depth defining a formation interval there between. The processing system further determines a second conductance based on the second signal level, and assigns a uniform resistivity value to the formation interval based on the first conductance and the second conductance.

FIG. 1 shows an illustrative logging while drilling scenario. In FIG. 1, a drilling assembly 12 enables a drill string 30 to be lowered and raised in a borehole 22A that penetrates formations 21 of the earth 20. The drill string 30 includes a plurality of drill string segments 32 joined by tool joints or connectors 34. At the lower end of the drill string 30, a bottom hole assembly 24 (BHA) with a drill bit 25 removes material and penetrates the formations 21 using known drilling techniques. The BHA 24 may include, for example, thick-walled tubulars called drill collars, which add weight and rigidity to aid the drilling process. The thick walls of these drill collars make them useful for housing instrumentation and LWD sensors. In at least some embodiments, the BHA 24 includes a logging tool 26 with a telemetry/control unit 28.

The logging tool 26 may also include one or more sensors 27 to measure parameters such as bit weight, torque, wear and bearing conditions. Additionally, parameters such as pressure and temperature as well as a variety of other environmental and formation information may be obtained by the sensors. A signal generated by the sensors 27 may typically be analog, which may be converted to digital data before electromagnetic transmission in the present system. The signal generated by sensors 27 is passed into an electronics package (not shown) including an analog-to-digital converter which converts the analog signal to a digital code utilizing "ones" and "zeros" for information transmission.

The electronics package may also include electronic devices such as an on/off control, a modulator, a microprocessor, memory and amplifiers. The electronics package may be powered by a battery pack which may include a plurality of batteries, such as nickel cadmium or lithium batteries, which are configured to provide proper operating voltage and current.

Once the electronics package establishes the frequency, power and phase output of the information, the electronics package feeds the information to telemetry/control unit 28, which includes electronics for data storage, communication, etc. The information collected by the logging tool 26 is then carried uphole to the earth's surface in the form of modulated EM signals which propagate through the earth. The collected data may also be stored by the telemetry/control unit 28.

In either case, the collected data can be analyzed as a function of position and/or time to determine properties of the formations 21. Moreover, the EM telemetry signals themselves can be used to determine formation resistivity as a function of position and/or time. Such resistivity information can be used, for example, to derive a saturation log as a function of position, to track movement of downhole fluids, and/or monitor other formation properties. The logs and/or formation properties derived from collected data and the EM telemetry signals may be displayed to an operator via computer 40.

In FIG. 1, an interface 14 at earth's surface for borehole 22A receives EM telemetry data from the BHA 24. In some embodiments, the surface interface 14 and/or a computer system 40 may perform various operations such as converting received signals from one format to another, storing telemetry data, processing telemetry data, deriving logs from the telemetry data, and/or displaying logs or other visualization of telemetry data. The computer 40 may also be used to store, process, and visualize resistivity logs derived from EM telemetry signals.

In at least some embodiments, the computer system 40 includes a processing unit 42 that performs telemetry analysis operations by executing software or instructions obtained from a local or remote non-transitory computer-readable medium 48. The computer system 40 also may include input device(s) 46 (e.g., a keyboard, mouse, touchpad, etc.) and output device(s) 44 (e.g., a monitor, printer, etc.). Such input device(s) 46 and/or output device(s) 44 provide a user interface that enables an operator to interact with the logging tool 26 and/or software executed by the processing unit 42. For example, the computer system 40 may enable an operator may select telemetry analysis options, to view collected telemetry data, to view telemetry analysis results, and/or to perform other tasks.

Formation evaluation is performed to achieve accurate well placement to maximize reservoir value, and while formation resistivity is regarded as being particularly helpful for this purpose, it is not always feasible to include a LWD resistivity tool in the BHA. However, it is often feasible to include an EM telemetry module in the BHA for communicating to/from the earth surface (e.g., BHA 24 of FIG. 1). EM telemetry enables the operator to closely monitor drilling dynamics data to achieve faster drilling. EM telemetry systems typically operate at frequencies between 1 and 50 Hz, with data rates nominally between 3 and 12 bps from a limited number of communication channels. As demonstrated herein, the EM telemetry signals may also be used to derive a formation resistivity log.

As will be described in more detail below, transmission of an EM telemetry signal may involve applying a voltage across a gap subassembly in the BHA. At the earth surface, an electromagnetic field is sensed with electrodes or magnetic field sensors. The wellhead may serve as one electrode, while an electrode spaced 10 m to 100 m away serves as a second electrode. A receiver coupled between the electrodes may sense the voltage between them, thereby obtaining the EM telemetry signal.

As described earlier with reference to FIG. 1, the BHA 24 includes a logging tool 26 with a telemetry/control unit 28. The telemetry/control unit 28 may include a gap subassembly, toroid, or magnetic dipole that serves as a transmitter antenna. The unit 28 may further include a separate receiver antenna, or the transmitter antenna may serve both roles.

Figure 2A:
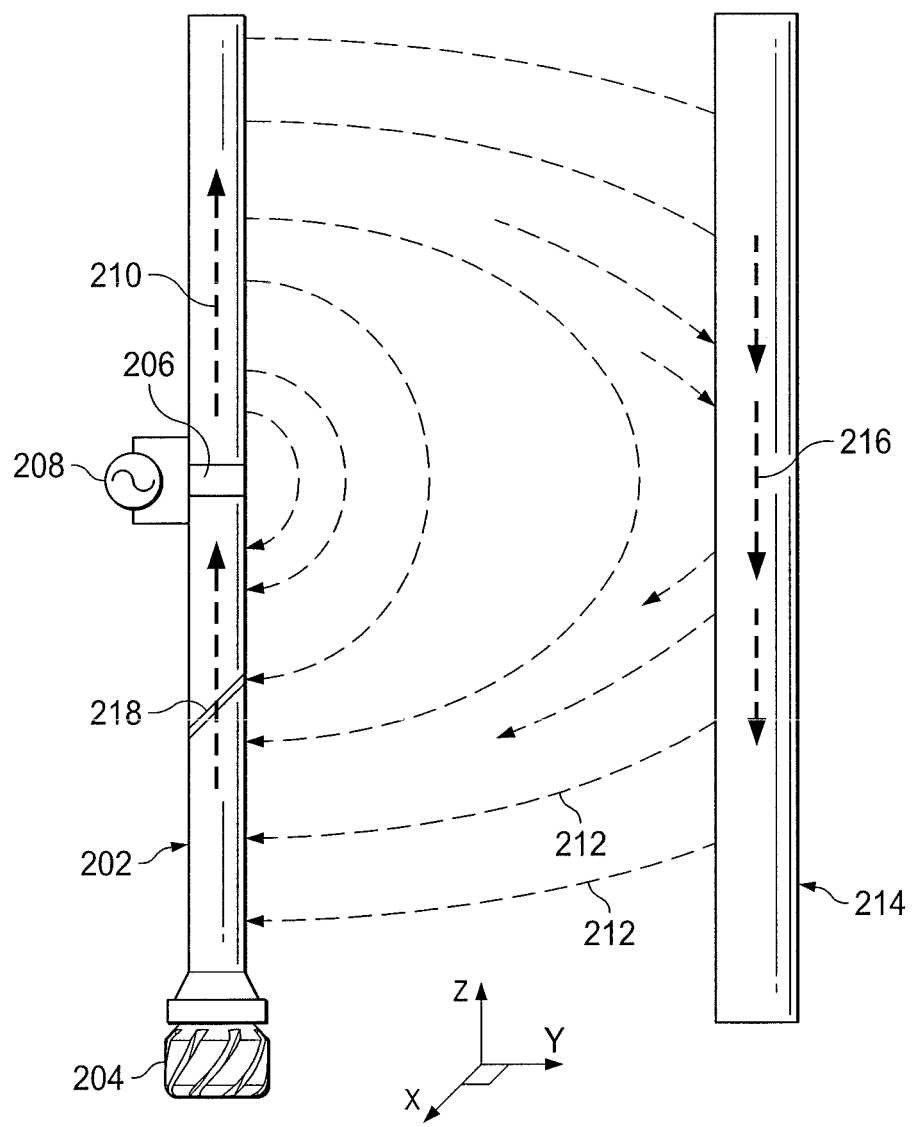
FIG. 2A is a simplified schematic representation of a gap subassembly.

FIG. 2A is a simplified schematic representation of a gap subassembly that may be included in the telemetry/control unit 28. An insulating gap 206 is located in a drill string 202 having a drill bit 204. A power source 208 applies an alternating voltage signal across the insulating gap 206, producing an electromagnetic signal that propagates outward through the formation, attenuated by currents induced in conductive portions of the formation. For the purposes of modeling, the voltage signal may be assigned an amplitude of a nominal value (e.g., 1V).

During drilling operations (e.g., LWD operations), the drill string (e.g., drill string 30, drill string 202) is gradually inserted into the borehole as the borehole is extended, causing the BHA 24 (including the telemetry/control unit 28) to become disposed at various measured depths within the borehole 22A while it operates to transmit and/or receive EM telemetry signals. Because the borehole may twist and bend, the measured depth (i.e., the distance the BHA has traveled) does not necessarily correspond to true vertical depth (TVD), but navigational instruments are employed to track the unit's current position. At least some differences in the measured depths may correspond to various vertical distances with respect to a location of a well head of the borehole 22A. Other differences in measured depths may correspond to various horizontal distances with respect to the location of the well head.

Figure 2B:
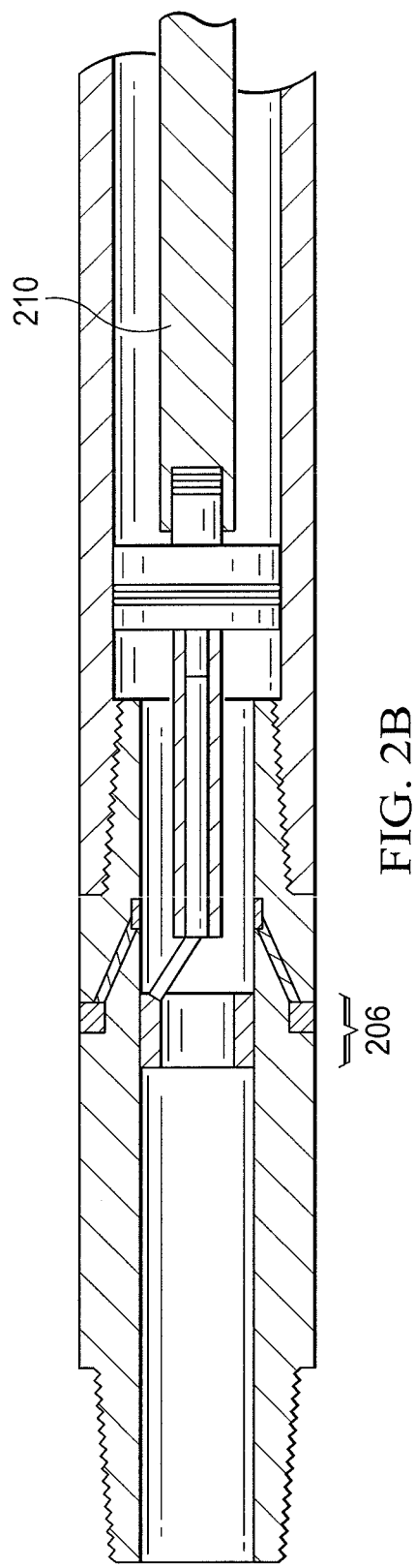
FIG. 2B is another simplified schematic representation of a gap subassembly.

FIG. 2B is another simplified schematic representation of a gap subassembly. With reference to FIG. 2B, an alternating voltage signal is applied across the insulating gap 206. In the schematic representation of FIG. 2B, the generation of the resulting electromagnetic signal is illustrated as a transmitter 210.

Figure 3:
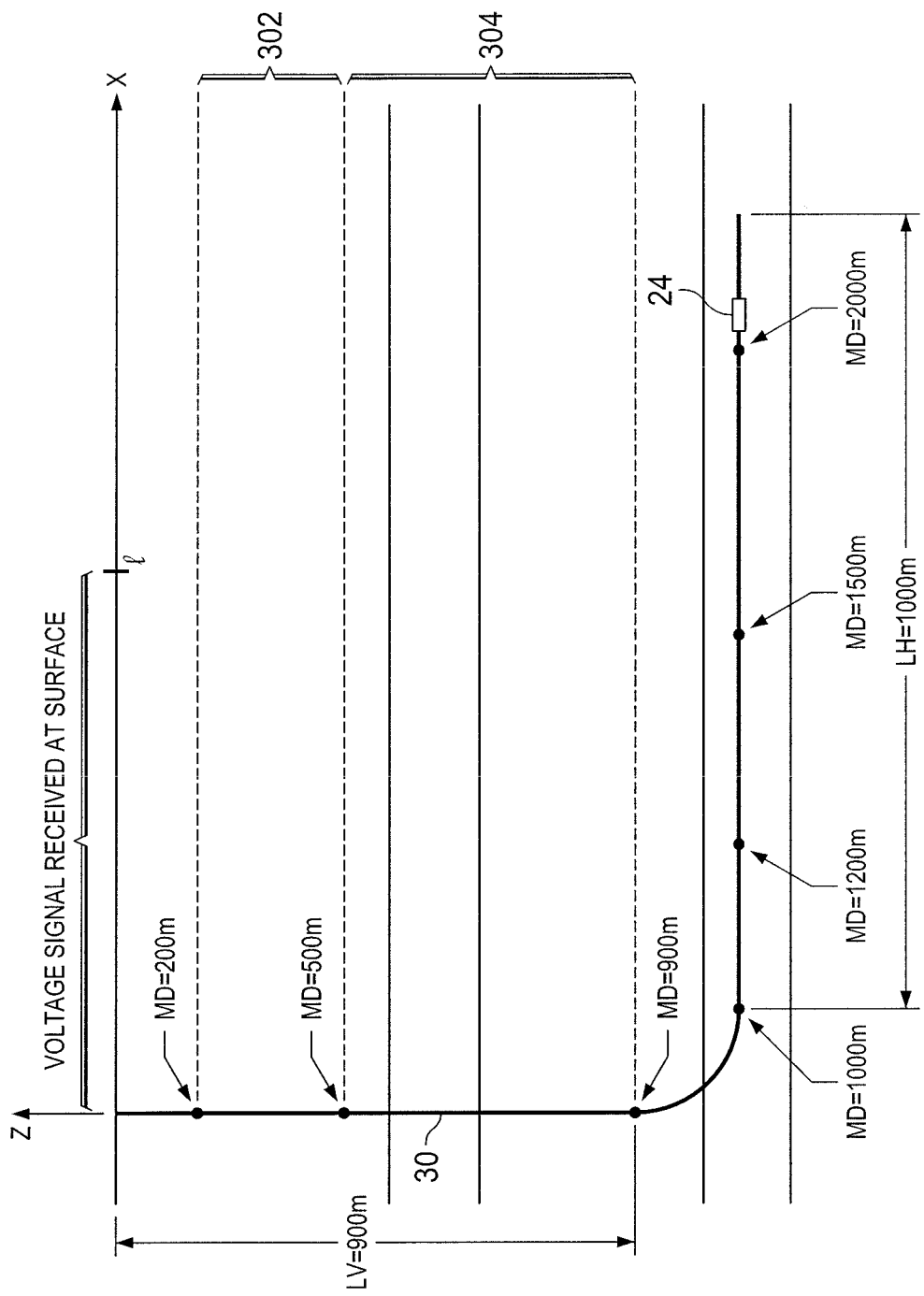
FIG. 3 is a schematic diagram showing an illustrative logging scenario.

FIG. 3 is a schematic diagram showing an illustrative logging while drilling scenario. With reference to FIG. 3, the drill string 30 is lowered such that the BHA 24 is disposed, at different times, at measured depths of 200 meters (m), 500 m, 900 m and 1000 m. As illustrated in FIG. 3, these measured depths correspond to different vertical distances (e.g., along the z-axis) with respect to the location of the well head of the borehole. In more detail, the measured depths of 200 m, 500 m, 900 m and 1000 m correspond, respectively, to vertical distances of 200 m, 500 m, 900 m and approximately 1000 m. When the BHA 24 is disposed at each of these measured depths, an alternating voltage signal (e.g., having an amplitude of 1V) is applied across an insulating gap of the BHA 24 (e.g., insulating gap 206), to cause an EM field to be generated.

As described above, the drill string 30 is lowered such that the BHA 24 is disposed at a measured depth of 1000 m. In addition, the drill string 30 may be further lowered such that the BHA 24 is disposed, at different times, at measured depths of 1200 m, 1500 m and 2000 m. As illustrated in FIG. 3, the measured depths of 1000 m, 1200 m, 1500 m and 2000 m correspond to approximately the same vertical distance with respect to the location of the well head. However, these measured depths correspond to different horizontal distances (e.g., along the x-axis) with respect to the location of the well head. When the BHA 24 is disposed at each of these measured depths, a modulated voltage signal is applied across the insulating gap of the BHA 24, to generate an EM telemetry signal.

As described earlier, the EM field generated by the BHA 24 (e.g., as the BHA is positioned at various measured depths) may be detectable at various locations. For example, the EM field may be detectable at locations along the earth surface.

Figure 4:
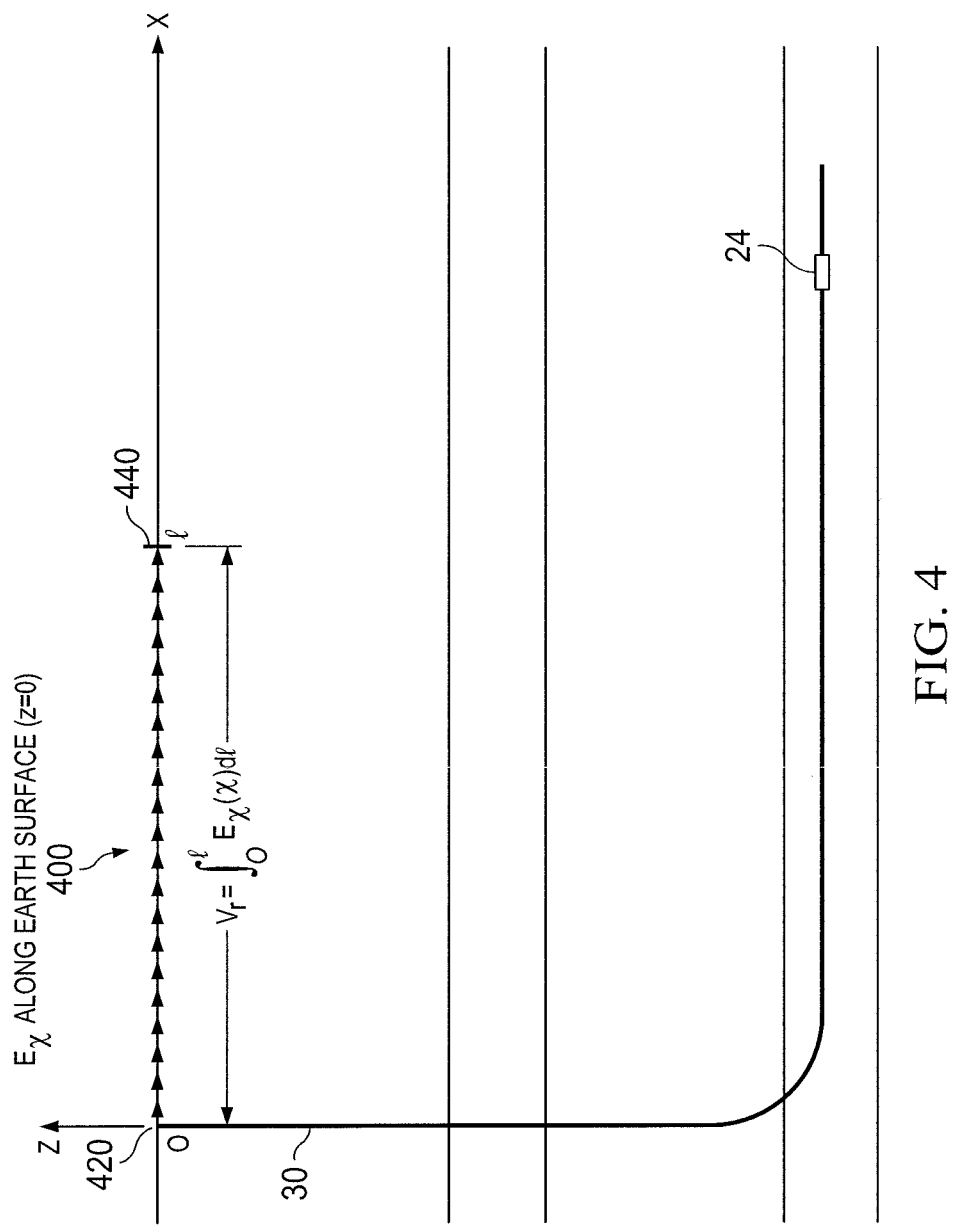
FIG. 4 is a schematic diagram showing a simplified illustrative logging scenario.

FIG. 4 is a schematic diagram showing an illustrative logging scenario. A receiver 400 located at the earth surface may detect the electromagnetic field. The receiver may be coupled between a well head 420 and an electrode 440 spaced apart from the well head. The electrode 440 may be spaced apart from the well head 420 by a horizontal distance (e.g., along the x-axis) of l. For example, the electrode 440 may be a counter electrode that is positioned at a horizontal distance l from the well head 420.

As the BHA 24 is positioned at various measured depths, the receiver 400 senses the electromagnetic field produced by the gap subassembly of BHA 24. The sensed EM telemetry signal values are supplied to computer 40.

The receiver 400 senses the voltage value between the well head 420 and the counter electrode 440. In this situation, a sensed voltage $V_r$ may be modeled as a line integral of the horizontal electric field $E_x$ at the surface, generated by the downhole telemetry module from the location of the well head 420 (x=0) to the location of the counter electrode 440 (x=l).

The processing unit 42 of computer 40 may use the sensed voltage $V_r$ to determine the resistivity (or conductivity) of one or more intervals of the formations 21. For example, with reference to FIGS. 3 and 4, the receiver may sense values of a horizontal electric field $E_x$ generated by the BHA 24 when the BHA is at a first measured depth (e.g., a measured depth of 200 m). The processing unit 42 measures the strength (amplitude or energy) of the sensed EM telemetry signals detected by the receiver, which we model here using a line integral of $E_x$ from the location of the well head 420 (x=0) to the location of the counter electrode 440 (x=l). The processing unit calculates a first conductance based on the calculated voltage and position of the EM transmitter relative to the wellhead and electrode. In some embodiments, the conductance may be based on a formation conductivity model that presumes zero conductivity above the earth's surface and a homogeneous formation resistivity everywhere below the earth's surface. In alternative embodiments, the conductance may be based on a formation conductivity model that presumes zero conductivity above the earth's surface and a heterogeneous formation resistivity below the earth's surface.

The drill string 30 is then progressively lowered to cause the BHA 24 to be positioned at a second measured depth that is greater than the first measured depth. For example, the second measured depth may be equal to 500 m. A formation interval 302 having a thickness of 300 m is defined between the second measured depth (500 m) and the first measured depth (200 m). The conductor 400 may sense values of the electromagnetic field $E_x$ generated by the BHA 24 when the BHA is at the second measured depth. The processing unit 42 calculates a signal strength based on the voltage signal values sensed by the receiver. A second conductance is determined based on the calculated voltage.

Based on the first conductance and the second conductance, the processing unit 42 calculates a resistivity log value that is assigned to the formation interval defined between the second measured depth and the first measured depth. The resistivity log value for each formation interval is presumed to be uniform throughout the interval.

In a similar manner, the processing unit 42 may calculate a resistivity log value that is assigned to another formation interval. For example, the processor may assign a second resistivity log value to a second formation interval 304 that is defined between the second measured depth and a third measured depth (e.g., a measured depth of 900 m). The second resistivity log value may be calculated based on the second conductance (corresponding to the second measured depth) and a third conductance (corresponding to the third measured depth).

In this manner, the processing unit 42 may generate a series of resistivity log values that may approximate a resistivity log that could have been generated by a formation resistivity tool. The processing unit 42 may generate the resistivity log based on real-time telemetry data and/or stored telemetry data that was received at a previous time(s).

An example of the determination of conductance and resistivity values will now be described in more detail.

When a BHA (e.g., BHA 24) is located at a measured depth $z_i$, the level of the signal received at the surface $S(z_1)$ (e.g., $V_r$ of FIG. 4) may be considered as a function of the formation conductivity σ, as follows:

$$S(z_i)=A(\sigma), \tag{1}$$

where the function A(·) may account for parameters relating to the drill string telemetry model (e.g., size of insulating gap, well casing, drilling fluid, drill collar properties, etc.).

As described earlier, a signal level $S(z_1)$ may be measured at a first measured depth $z_1$. This measurement may be performed while a transmitter (e.g., gap subassembly of BHA 24) is transmitting at a frequency $f_1$. Regardless of the actual formation conductivity σ, an equivalent half-space conductivity $\sigma_1$ (corresponding to the first measured depth $z_1$) can be calculated such that:

$$\|S(z_1)A(\sigma_1)\| \rightarrow \min. \tag{2}$$

As noted earlier, the signal level received at the surface $S(z_i)$ may be considered as a function A(·) of the formation conductivity a. In Equation (2), $A(\sigma_1)$ maps the equivalent half-space conductivity $\sigma_1$ to the signal level $S(z_1)$.

A conductance $m(z_i)$ is a measure of the cumulative conductivity-thickness product. $m(z_i)$ may be expressed as follows:

$$m(z_i)=\int_0^{z_i} \sigma(z)dz. \tag{3}$$

As can be seen from the above Equation (3), the conductance $m(z_i)$ between the BHA ($z=z_i$) and the earth surface (z=0) can only increase as the measured depth $z_i$ increases.

Based on the equivalent half-space conductivity $\sigma_1$, a first conductance $s(z_1)$ (corresponding to the first measured depth $z_1$) may be expressed as:

$$m(z_1)=\sigma_1 z_1. \tag{4}$$

Similar formulations may apply when the BHA 24 is located at a second measured depth $z_2$ that is greater than the first measured depth $z_1$. As described earlier, a signal level $S(z_2)$ is measured at the second measured depth $z_2$. This measurement may be performed while the transmitter (e.g., gap subassembly of BHA 24) is transmitting at a frequency $f_2$, which may be equal to or different from the frequency $f_1$. Regardless of the actual formation conductivity a, a second equivalent half-space conductivity $\sigma_2$ (corresponding to the second measured depth $z_2$) can be calculated that:

$$\|S(z_2)-A(\sigma_2)\| \rightarrow \min. \tag{5}$$

Similar to $A(\sigma_1)$ of Equation (2), $A(\sigma_2)$ of Equation (5) maps the equivalent half-space conductivity $\sigma_2$ to the signal level $S(z_2)$.

A second conductance $m(z_2)$ (corresponding to the second measured depth $z_2$) may be expressed as:

$$m(z_2)=\sigma_2 z_2. \quad (6)$$

Based on equation (1), the second conductance $m(z_2)$ may also be expressed as:

$$m(z_2)=m(z_1)+\int_{z_1}^{z_2}\sigma(z)dz\approx m(z_1)+\sigma(z_2-z_1). \quad (7)$$

Equation (7) may be expressed differently to express the formation conductivity $\sigma$ of a formation interval that is defined between the measured depths $z_2$ and $z_1$. The formation conductivity $\sigma$ of such a formation interval may be expressed as:

$$\sigma = \frac{\sigma_2 z_2 - \sigma_1 z_1}{z_2 - z_1}. \quad (8)$$

Accordingly, the above formation conductivity $\sigma$ (or its reciprocal, the formation resistivity) may be assigned to the formation interval that is between the measured depths $z_2$ and $z_1$.

By repeating the described process for measurements taken at additional depths, it is possible to generate a conductivity-depth log (or a formation resistivity log) for the well trajectory.

As described earlier, the level of the signal received at the surface $S(z_1)$ may be considered as a function $A(\cdot)$ of the (half-space) formation conductivity $\sigma$. The function $A(\sigma)$ that maps an equivalent half-space conductivity to a signal level may account for one or more various parameters of a particular drill string telemetry model (e.g., formation conductivity, well casing, drill collar size, gap subassembly size, etc.).

The function $A(\sigma_i)$ may be a closed form analytic solution. Alternatively, the function $A(\sigma_i)$ may be a numerical modeling algorithm involving, e.g., 2D or 3D finite-elements, finite-differences, integral equations, or hybrids thereof. Yet alternatively, the function $A(\sigma_i)$ may be based on a database populated with values calculated from analytical or numerical model data. The database may be multi-dimensional, and may contain signal levels calculated for discrete model parameters. In order to evaluate signal levels for arbitrary model parameters more accurately and efficiently, a multiplicative 1D spline interpolation technique may be employed. To improve computational efficiency, the spline coefficients, instead of the signal levels, may be stored in the database. Fréchet derivatives (or Jacobians or sensitivities) may be readily evaluated from multiplication 1D spline interpolation and differentiation.

An example will now be described in more detail. In this example, the function $A(\sigma_i)$ is a closed form analytic solution. In this regard, the function $A(\sigma_i)$ represents the attenuation of a voltage signal along a drill string.

A transmitter (e.g., gap subassembly of BHA 24) generates an electromagnetic signal while it is located at a vertical depth of $z=z_i$. The received signal level $S$ at $z=0$ (e.g., earth surface) is calculated by subtracting an amount of signal attenuation from the transmitted signal level $S_0$, expressed in decibels (dB):

$$S=S_0-\alpha_i z_i. \quad (9)$$

The signal attenuation $\alpha_i$ may be approximated based on a closed form solution for a current attenuation along a cylindrical conductor that is embedded in a homogeneous, conductive formation. The attenuation $\alpha_i$ (in units of dB per 1000 feet) in a first formation layer (or interval) having a conductivity $\sigma_i$ may be expressed as:

$$\alpha_i = 70.3 \left(\frac{a}{b}\right)^{1/2}, \quad (10)$$

where:

$$a = \sigma_i f \coth\left(2.28 f^{\frac{1}{2}} \tau\right), \quad (11)$$

$$b = D\ln\left(\frac{3.94E4}{D\sqrt{\sigma_i f}}\right), \quad (12)$$

and where f denotes the frequency (e.g., in Hz), $\tau$ denotes the thickness of the drill collar wall (e.g., in inches), D denotes the outer drill collar outer diameter (e.g., in inches), and $\sigma_i$ denotes the half-space conductivity (e.g., in S/m).

Equation (9) may be expressed in a different manner as follows:

$$\alpha_i = \frac{S_0 - S}{z_i}. \quad (13)$$

By substituting equations (11), (12) and (13) into equation (10), an equation for the half-space conductivity $\sigma_i$ may be expressed as:

$$A_1 \cdot \sigma_i + A_2 \ln(\sigma_i) + A_3 = 0, \quad (14)$$

where:

$$A_1 = f\coth\left(2.28 f^{\frac{1}{2}}\tau\right), \quad (15)$$

$$A_2 = \left(\frac{S_0 - S_i}{70.3 z_i}\right)^2 \cdot \frac{D}{2}, \text{ and} \quad (16)$$

$$A_3 = -\left(\frac{S_0 - S_i}{70.3 z_i}\right)^2 \cdot D \cdot \ln\left(\frac{3.94E4}{D\sqrt{f}}\right). \quad (17)$$

If $\sigma_i$ is denoted as x, then Equation (14) may be rewritten as follows:

$$f(x)=A_1 \cdot x + A_2 \ln(x) + A_3 = 0. \quad (18)$$

Taking the first derivative f'(x) of Equation (18) produces:

$$f'(x) = A_1 + \frac{A_2}{x} = 0, \quad (19)$$

If an initial assumption of $x_0=1$ is made, an iterative Newton method may be applied to determine the following:

$$x_1 = x_0 - \frac{f(x_0)}{f'(x_0)}, \quad (20)$$

$$x_2 = x_1 - \frac{f(x_1)}{f'(x_1)}, \quad (21)$$

$$\vdots$$

$$x_i = x_{i-1} - \frac{f(x_{i-1})}{f'(x_{i-1})}, \quad (22)$$

until a termination criteria $|x_i - x_{i-1}| < \in$ is satisfied, where $\in$ denotes a tolerance. The half-space conductivity is solved as $\sigma_i = x$.

Figure 5:
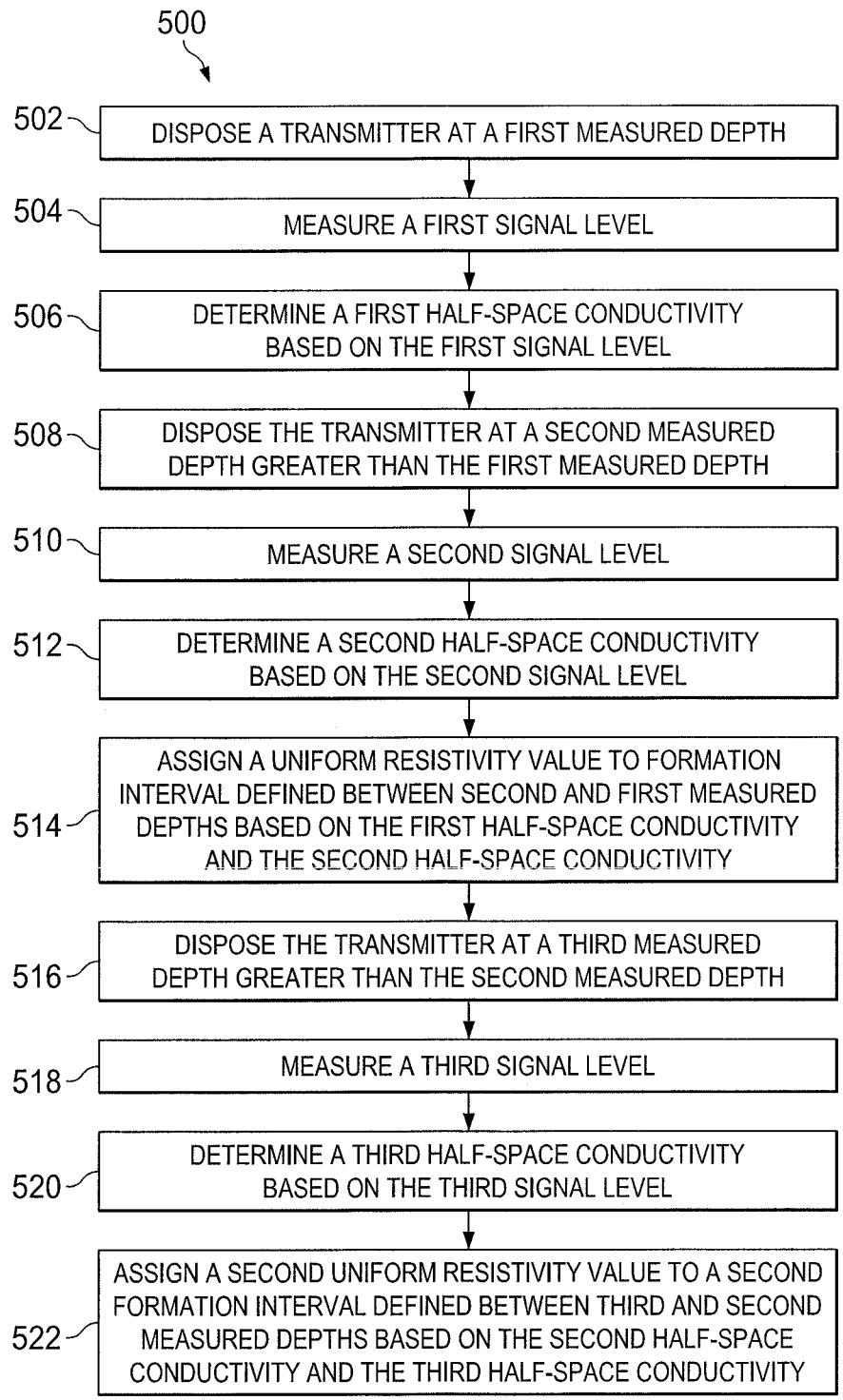
FIG. 5 is a flowchart showing an illustrative logging method employing an electromagnetic logging tool.

FIG. 5 is a flowchart showing an illustrative method for deriving a resistivity log from EM telemetry signal strength as a function of position. In the method 500, a transmitter (e.g., a gap subassembly of a BHA) is disposed at a first measured depth at block 502. In this regard, a voltage may be applied across the gap subassembly. At block 504, a first signal level is measured in response to the transmitter being at the first measured depth. For example, an electric field may be measured at an earth surface for the wellbore (e.g., along a particular length of the earth surface). At block 506, a first half-space conductivity is determined based on the first signal level. For example, a formation conductivity model may be applied in determining the half-space conductivity. The formation conductivity model may account for parameters such as a size of the gap subassembly, an outer diameter of a drill collar, and/or a thickness of a wall of the drill collar. At block 508, the transmitter is disposed at a second measured depth that is greater than the first measured depth. The second measured depth and the first measured depth define a formation interval there between. At block 510, a second signal level is measured in response to the transmitter being disposed at the second measured depth. At block 512, a second half-space conductivity is determined based on the second signal level. At block 514, a uniform resistivity value is assigned to the formation interval based on the first half-space conductivity and the second half-space conductivity.

At least blocks 508, 510, 512 and 514 in method 500 may be performed multiple times while during drilling of a borehole. For example, at block 516, the transmitter is further measured at a third measured depth that is greater than the second measured depth. The third measured depth and the second measured depth define a second formation interval there between. At block 518, a third signal level is measured in response to the transmitter being at the third measured depth. At block 520, a third half-space conductivity is determined based on the third signal level. At block 522, a second uniform resistivity value is assigned to the second formation interval based on the second half-space conductivity and the third half-space conductivity.

FIG. 6 is a graph 600 showing illustrative signal levels received during a logging scenario. In the logging scenario, a drill string is lowered in a borehole such that a transmitter (e.g., a gap subassembly of a BHA 24 of FIG. 1) is positioned at various measured depths in the range of 0 to 3000 feet. As the transmitter is positioned at each of the various depths, a level of an EM telemetry signal received at the earth surface (e.g., a voltage $V_r$ of FIG. 3) is determined. As illustrated in the graph of FIG. 6, the strength of the received signal decreases as the measured depth increases.

FIG. 7 is a graph 700 showing an illustrative resistivity profile. The profile corresponds to the logging scenario of FIG. 6. In the graph 700, points 702, 704, 706 correspond to resistivity values that are based on the levels of the EM telemetry signals received at the earth surface. As further illustrated in FIG. 7, the points 702, 704, 706 (which are based on EM telemetry signals) may be suitable approximation of points on a resistivity log that is generated by a resistivity logging tool (e.g., a tool that may involve a transmitter antenna and multiple receiver antennas located at different distances from the transmitter antenna along the axis of the tool). If the points 702, 704, 706 are determined based on EM telemetry signals and these points are suitable approximations, then it may not be necessary to use such a resistivity logging tool in order to provide an indication of the electrical resistivity of rock formations surrounding an earth borehole.

Various equations may involve using approximations. However, it is understood that these equations may be modified to account for additional factors. For example, equations may be modified to account for an impedance of the downhole transmitter unit (DTU) (e.g., an impedance of the gap subassembly of the BHA). As another example, in the following inversion of signal level for half-space conductivity:

$$\|S(z_i) - A(\sigma_i)\| \to \min, \quad (23)$$

the minimization process of the above Equation (23) may be augmented with regularization.

Various embodiments were described earlier with respect to a model based on formation intervals (e.g., intervals 302, 304) having a uniform half-space conductivity. The model may be modified to be based on formation intervals having a layered half-space conductivity $\sigma(z)$. Also, the formation conductivity model may be frequency dependent (e.g., inclusive of induced polarization parameters) and/or anisotropic.

Processes and methods disclosed herein may be implemented as either stand-alone software, integrated as part of a commercial LWD data acquisition and processing software (e.g., INSITE), or within well logging software. Methods disclosed herein may be encapsulated in software which may be programmed on serial and/or parallel processing architectures. Methods disclosed and related functions may be performed remotely from the well site (e.g., on remote servers or cloud computers), and computers located at the well site may be connected to remote processing computers via a network. Accordingly, computers located at the well site may not be required to provide a suitably high level of computational performance.

As disclosed earlier, resistivity determinations may be based on EM telemetry signal levels received by a surface receiver unit (SRU) (e.g., conductor 400) from a downlink transmitter unit (DTU) (e.g., BTA 24), or vice versa. Alternatively (or in addition), the resistivity determinations may be based on EM telemetry signal levels received by an SRU from a downhole repeater unit (DRU) (e.g., a repeater unit uphole from the DTU), or vice versa. Alternatively (or in addition), the resistivity determinations may be based on EM telemetry signal levels received by a DRU from a DTU, or vice versa. It is understood that there may be spatial overlap between DRU and DTU data, and transformation of such data may be performed transformed independently, cooperatively, or jointly.

Embodiments disclosed herein include:

A: A system that includes an electromagnetic logging tool that transmits an electromagnetic signal as the tool is conveyed along a borehole through a formation. The system also includes a processing system that measures a first signal level in response to the tool being at a first measured depth, determines a first conductance based on the first signal level, measures a second signal level in response to the tool being at a second measured depth greater than the first measured depth, the second measured depth and the first measured depth defining a formation interval there between, determines a second conductance based on the second signal level, and assigns a uniform resistivity value to the formation interval based on the first conductance and the second conductance.

B. A method that includes disposing a transmitter at a first measured depth, measuring a first signal level in response to the transmitter being at the first measured depth, and determining a first conductance based on the first signal level. The method also includes disposing the transmitter at a second measured depth greater than the first measured depth, the second measured depth and the first measured depth defining a formation interval there between, measuring a second signal level in response to the transmitter being at the second measured depth, determining a second conductance based on the second signal level, and assigning a uniform resistivity value to the formation interval based on the first conductance and the second conductance.

Each of the embodiments, A and B, may have one or more of the following additional elements in any combination. Element 1: wherein the processing system further measures a third signal level in response to the tool being at a third measured depth greater than the second measured depth, the third measured depth and the second measured depth defining a second formation interval there between, determines a third conductance based on the third signal level, and assigns a second uniform resistivity value to the second formation interval based on the second conductance and the third conductance. Element 2: wherein the tool comprises a bottom hole assembly comprising a gap subassembly. Element 3: wherein the tool transmits the electromagnetic signal in response to application of a voltage across the gap subassembly. Element 4: wherein the processing system measures the first signal level by measuring an electromagnetic field at an earth surface. Element 5: wherein the processing system measures the electromagnetic field at the earth surface by measuring the electromagnetic field along a particular length of the earth surface. Element 6: further comprising a conductor extending along the particular length of the earth surface, wherein the processing system measures the electromagnetic field along the particular length of the earth surface using values of the electromagnetic field sensed by the conductor. Element 7: wherein the processing system determines the first conductance by applying a formation conductivity model. Element 8: wherein the tool comprises a bottom hole assembly comprising a gap subassembly and a drill collar, and the formation conductivity model accounts for at least a size of the gap subassembly, an outer diameter of the drill collar, or a thickness of a wall of the drill collar. Element 9: wherein the electromagnetic logging tool is a logging-while-drilling tool.

Element 10: further comprising disposing the transmitter at a third measured depth greater than the second measured depth, the third measured depth and the second measured depth defining a second formation interval there between, measuring a third signal level in response to the transmitter being at the third measured depth, determining a third conductance based on the third signal level, and assigning a second uniform resistivity value to the second formation interval based on the second conductance and the third conductance. Element 11: wherein the transmitter comprises a gap subassembly of a bottom hole assembly. Element 12: wherein disposing the transmitter at the first measured depth comprises applying a voltage across the gap subassembly. Element 13: wherein measuring the first signal level comprises measuring an electromagnetic field at an earth surface for the wellbore. Element 14: wherein measuring the electromagnetic field at the earth surface comprises measuring the electromagnetic field along a particular length of the earth surface. Element 15: wherein determining the first conductance comprises applying a formation conductivity model. Element 16: wherein the transmitter comprises a gap subassembly of a bottom hole assembly, and the formation conductivity model accounts for at least a size of the gap subassembly, an outer diameter of a drill collar, or a thickness of a wall of the drill collar.

Numerous variations and modifications will become apparent to those skilled in the art once the above disclosure is fully appreciated. The methods and systems can be used for generating resistivity logs using telemetry data produced during drilling operations. The ensuing claims are intended to cover such variations where applicable.

What is claimed is:

1. A method for determining formation resistivity along a wellbore, comprising:
    disposing a bottom hole assembly (BHA) into a formation at a first measured depth wherein the BHA includes a gap subassembly;
    generating a first signal level from the BHA by a power source alternating a voltage across the gap subassembly;
    measuring the first signal level with one or more electrodes or one or more magnetic field sensors disposed on earth's surface in response to the BHA being at the first measured depth;
    determining a first conductance based on the first signal level;
    moving the BHA to a second measured depth greater than the first measured depth during drilling operations, the second measured depth and the first measured depth defining a formation interval there between;
    generating a second signal level from the BHA by the power source alternating the voltage across the gap subassembly;
    measuring a second signal level with the one or more electrodes or the one or more magnetic field sensors disposed on earth's surface in response to the BHA being at the second measured depth;
    determining a second conductance based on the second signal level; and
    assigning a uniform resistivity value to the formation interval based on the first conductance and the second conductance.

2. The method of claim 1, further comprising:
    disposing the BHA at a third measured depth greater than the second measured depth, the third measured depth and the second measured depth defining a second formation interval there between;
    measuring a third signal level in response to the BHA being at the third measured depth;
    determining a third conductance based on the third signal level;
    assigning a second uniform resistivity value to the second formation interval based on the second conductance and the third conductance.

3. The method of claim 1, wherein measuring the first signal level comprises measuring an electromagnetic field at the earth surface for the wellbore.

4. The method of claim 3, wherein measuring the electromagnetic field at the earth surface comprises measuring the electric field along a particular length of the earth surface.

5. The method of claim 1, wherein determining the first conductance comprises applying a formation conductivity model.

6. The method of claim 5, wherein:
    the formation conductivity model accounts for at least a size of the gap subassembly, an outer diameter of a drill collar, or a thickness of a wall of the drill collar.

7. A logging system that comprises:
a bottom hole assembly (BHA) comprising:
  a gap subassembly; and
  a power source that is configured to alternate voltage across the gap subassembly to generate an electromagnetic signal in a formation; and
one or more electrodes or one or more magnetic field sensors disposed on earth's surface that measure a first signal level in response to the tool being at a first measured depth and measure a second signal level in response to the tool being at a second measured depth greater than the first measured depth; and
a processing system that is configured to determine a first conductance based on the first signal level, determine a second conductance based on the second signal level, and assigns a uniform resistivity value to the formation interval based on the first conductance and the second conductance.

8. The logging system of claim 7, wherein the processing system further measures a third signal level in response to the tool being at a third measured depth greater than the second measured depth, the third measured depth and the second measured depth defining a second formation interval there between, determines a third conductance based on the third signal level, and assigns a second uniform resistivity value to the second formation interval based on the second conductance and the third conductance.

9. The logging system of claim 7, wherein the processing system measures the first signal level by measuring an electromagnetic field at the earth surface.

10. The logging system of claim 9, wherein the processing system measures the electromagnetic field at the earth surface by measuring the electric field along a particular length of the earth surface.

11. The logging system of claim 1, further comprising a conductor extending along the particular length of the earth surface, wherein the processing system measures the electromagnetic field along the particular length of the earth surface using values of the voltage sensed by the conductor.

12. The logging system of claim 7, wherein the processing system determines the first conductance by applying a formation conductivity model.

13. The logging system of claim 12, wherein:
the tool comprises a bottom hole assembly comprising a gap subassembly and a drill collar; and
the formation conductivity model accounts for at least a size of the gap subassembly, an outer diameter of the drill collar, or a thickness of a wall of the drill collar.

14. The logging system of claim 7, wherein the electromagnetic logging tool is a logging-while-drilling tool.

* * * * *